United States Patent
Lacan et al.

(10) Patent No.: US 7,818,581 B2
(45) Date of Patent: *Oct. 19, 2010

(54) DATA MANAGEMENT SYSTEM

(75) Inventors: Francis M. Lacan, London (GB);
Ronald Perez, Mount Kisco, NY (US);
Michael I. Shub, New York, NY (US);
Charles P. Tresser, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 73 days.

This patent is subject to a terminal disclaimer.

(21) Appl. No.: 12/110,995

(22) Filed: Apr. 28, 2008

(65) Prior Publication Data
US 2008/0222429 A1 Sep. 11, 2008

Related U.S. Application Data

(63) Continuation of application No. 09/988,320, filed on Nov. 16, 2001, now Pat. No. 7,370,366.

(51) Int. Cl.
*G06F 21/00* (2006.01)
*G06F 12/14* (2006.01)

(52) U.S. Cl. ........................... 713/182; 726/22
(58) Field of Classification Search ........................ None
See application file for complete search history.

(56) References Cited

U.S. PATENT DOCUMENTS

| | | | |
|---|---|---|---|
| 4,375,579 A | 3/1983 | Davida et al. | |
| 4,378,059 A | 3/1983 | Hatakeyama et al. | |
| 5,204,961 A | 4/1993 | Barlow | |
| 5,355,474 A | 10/1994 | Thuraisngham et al. | |
| 5,448,702 A | 9/1995 | Garcia, Jr. et al. | |
| 5,572,673 A | 11/1996 | Shurts | |
| 5,787,189 A | 7/1998 | Lee et al. | |
| 5,799,310 A | 8/1998 | Anderson et al. | |
| 5,802,499 A | 9/1998 | Sampson et al. | |
| 5,845,068 A | 12/1998 | Winiger | |
| 5,855,018 A | 12/1998 | Chor et al. | |
| 5,859,966 A | 1/1999 | Hayman et al. | |
| 5,970,464 A | 10/1999 | Apte et al. | |

(Continued)

FOREIGN PATENT DOCUMENTS

EP 0990972 A1 4/2000

(Continued)

OTHER PUBLICATIONS

G. T. Duncan & S. Mukherjee, "Microdata Disclosure Limitation in Statistical Databases: Query Size and Random Sample Query Control," IEEE, pp. 278-287, 1991.

(Continued)

*Primary Examiner*—Brandon S Hoffman
(74) *Attorney, Agent, or Firm*—Douglas Lashmit Hoffman Warnick LLC (57) ABSTRACT

A data management system and method are provided. Specifically, the present invention includes a system for controlling access to data and ensuring that the confidentiality of the data maintained. In addition, the present invention provides a system for updating data so that confidential data, which has become non-confidential, can be identified and exposed.

20 Claims, 4 Drawing Sheets

U.S. PATENT DOCUMENTS

| | | | |
|---|---|---|---|
| 5,974,141 | A | 10/1999 | Saito |
| 6,011,847 | A | 1/2000 | Follendore, III |
| 6,023,765 | A | 2/2000 | Kuhn |
| 6,047,291 | A | 4/2000 | Anderson et al. |
| 6,073,106 | A | 6/2000 | Rozen et al. |
| 6,076,077 | A | 6/2000 | Saito |
| 6,085,191 | A | 7/2000 | Fisher et al. |
| 6,219,805 | B1 | 4/2001 | Jones et al. |
| 6,226,745 | B1 | 5/2001 | Wiederhold |
| 6,253,203 | B1 | 6/2001 | O'Flaherty et al. |
| 6,260,019 | B1 | 7/2001 | Courts |
| 6,275,814 | B1 | 8/2001 | Giansante et al. |
| 6,275,824 | B1 | 8/2001 | O'Flaherty et al. |
| 6,289,462 | B1 | 9/2001 | McNabb et al. |
| 6,311,270 | B1 | 10/2001 | Challener et al. |
| 6,314,519 | B1 | 11/2001 | Davis et al. |
| 6,385,609 | B1 | 5/2002 | Barshefsky et al. |
| 6,425,828 | B2 | 7/2002 | Walker et al. |
| 6,480,850 | B1 | 11/2002 | Veldhuisen |
| 6,487,552 | B1 * | 11/2002 | Lei et al. ........................ 707/4 |
| 6,553,471 | B1 | 4/2003 | O'Hare et al. |
| 6,578,037 | B1 | 6/2003 | Wong et al. |
| 6,631,371 | B1 | 10/2003 | Lei et al. |
| 6,744,894 | B1 | 6/2004 | Saito |
| 6,792,425 | B2 | 9/2004 | Yagawa et al. |
| 6,802,013 | B1 | 10/2004 | Follendore, III |
| 6,820,082 | B1 | 11/2004 | Cook et al. |
| 6,938,022 | B1 * | 8/2005 | Singhal ........................ 705/74 |
| 6,996,544 | B2 | 2/2006 | Sellars et al. |
| 7,130,852 | B2 | 10/2006 | Parent |
| 2001/0021926 | A1 | 9/2001 | Schneck et al. |
| 2001/0026619 | A1 | 10/2001 | Howard et al. |
| 2001/0032168 | A1 | 10/2001 | Adamson et al. |
| 2001/0044886 | A1 | 11/2001 | Cassagnol et al. |
| 2002/0026345 | A1 | 2/2002 | Juels |
| 2002/0029201 | A1 | 3/2002 | Barzilai et al. |
| 2002/0032646 | A1 | 3/2002 | Sweeney et al. |
| 2002/0073313 | A1 | 6/2002 | Brown et al. |
| 2002/0082996 | A1 | 6/2002 | Scott et al. |
| 2002/0178035 | A1 | 11/2002 | Lajouanie |
| 2002/0184068 | A1 | 12/2002 | Krishnan et al. |
| 2002/0194113 | A1 | 12/2002 | Lof et al. |
| 2003/0005331 | A1 | 1/2003 | Williams |
| 2003/0065613 | A1 | 4/2003 | Smith |
| 2004/0049679 | A1 | 3/2004 | Meggle |
| 2004/0059683 | A1 | 3/2004 | Epstein et al. |
| 2004/0236698 | A1 | 11/2004 | Sweeney |

FOREIGN PATENT DOCUMENTS

| | | |
|---|---|---|
| EP | 0990972 A1 | 5/2000 |
| EP | 1031908 A2 | 8/2000 |
| EP | 1089196 A2 | 4/2001 |
| JP | 09185541 | 7/1997 |
| JP | 200002983 | 1/2000 |
| JP | 2000112796 | 4/2000 |
| JP | 2001118042 | 4/2001 |
| WO | 0010278 A2 | 2/2000 |
| WO | 0010278 A3 | 2/2000 |

OTHER PUBLICATIONS

U. S. Dept. Of Commerce, "Security Requirements for Cryptographic Modules," Federal Information Processing Standards Publication, FIPS PUB 140-1, Washington, DC, Jan. 11, 1994, pp. 1-44.

Patent Cooperation Treaty, Notification of Transmittal of the International Search Report or the Declaration, 5 page, Mar. 11, 2004.

Patent Cooperation Treaty, Written Opinion, 6 pages, May 3, 2004.

Application No. 2,463,834, Canadian Intellectual Property Office Communication, Aug. 5, 2008, 2 pages.

* cited by examiner

DATA MANAGEMENT SYSTEM

REFERENCE TO PRIOR APPLICATIONS

This application is a continuation application of application Ser. No. 09/988,320, filed Nov. 16, 2001, now U.S Pat. No. 7,370,366 issued May 6, 2008, which is hereby incorporated by reference.

BACKGROUND OF THE INVENTION

1. Field of the Invention

The present invention generally relates to a secure system and method for managing potentially confidential data. In particular, the present invention relates to a system and method for managing data so that access to the data is controlled and confidentiality of the data is ensured.

2. Background Art

In several industries, such as banking and insurance, a good statistical understanding of several types of data is either vital, or at least crucial for economic success. For example, actuarial charts are an extremely valuable resource to the insurance industry. In this case, the data sets are so large that precise data modeling can be done. Moreover, since the essential elements of information that need to be taken into account are not confidential, data sharing among market participants is somewhat common. Typically, the distributions describing such data have so called "thin tails," which generally means that events quite different from the most typical events are extremely rare. As a consequence of this and other characteristics that allow for better statistical analysis, premium pricing can be done so that it is both attractive to customers and profitable for insurers.

In contrast, other types of data (e.g., operational risk data) are considered sensitive, and as such, are rarely reported. Usually, the distributions that capture these types of data have fat tails (i.e., abnormally many extreme events). "Operational Risk" relates to the risk of direct or indirect loss resulting from inadequate or failed internal processes, people and systems, or from external events. This type of risk is typically linked to events that institutions such as banks prefer to keep confidential (e.g., hacking on their systems, failure due to man or a machine to complete a trade, etc). Thus, companies that would benefit from sharing data about operational risk to augment the quality of important statistics cannot do so because of the confidentiality breaches that sharing would imply.

Heretofore, attempts have been made to use a third party to collect such sensitive data. However, a problem connected with third party collection is directly linked to the lack of control of the third party. Specifically, the third party usually does not obtain all of the necessary data. Moreover, access to the data in these instances (e.g., by employees of the third party) is often not controlled. Thus, confidential details are at risk of being exposed.

In view of the foregoing, there exists a need for a secure system and method for managing confidential data so that the data can be analyzed and remain confidential. Moreover, a need exists for a system and method in which access to data is limited to only approved or authorized entities. A further need exists for a system and method in which confidential details in received data can be readily identified and concealed. Another need exists for a system and method in which confidential details that have become non-confidential can be identified and exposed.

SUMMARY OF THE INVENTION

In general, the present invention provides a data management system and method. Specifically, under the present invention, encrypted data is received from providers at randomly generated time intervals. Once received, the data is decrypted, and any confidential details contained therein are identified and concealed. The data is then stored for statistical analysis with all data (including confidential data) being accessible for analysis as long as the confidentiality of the data is not compromised. Periodically, the stored data can be updated by identifying and exposing any confidential details that have become non-confidential. Access to the data is limited to entities designated as "authorized." Thus, even entities such as system owners, administrators, etc. may not be able to gain access.

According to a first aspect of the present invention, a data management system is provided. The system comprises: (1) an access control system for limiting access to the data management system to authorized entities; (2) a data confidentiality system for identifying and concealing confidential details in received data; (3) a data storage system for storing the received data; and (4) a data update system for examining stored data to identify and expose non-confidential details.

According to a second aspect of the present invention, a data management system is provided. The system comprises: (1) an access control system for limiting access to the data management system to authorized entities; (2) a data decryption system for receiving and decrypting received operational risk data; (3) a data confidentiality system for identifying and concealing confidential details in the received data; (4) a data storage system for storing received data after the confidential details have been concealed; (5) a data update system for examining stored data to identify and expose non-confidential details; (6) a program approval system for approving systems for analyzing the stored data; and (7) a key security system for protecting encryption keys.

According to a third aspect of the present invention, a method for managing data is provided. The method comprises: (1) receiving data in a secured manner from an authorized provider; (2) identifying and concealing confidential details in the received data; (3) storing the received data; and (4) updating the stored data by identifying and exposing non-confidential details in the stored data.

According to a fourth aspect of the present invention, a program product stored on a recordable medium for managing data is provided. When executed, the program product comprises: (1) an access control system for limiting access to the data management system to authorized entities; (2) a data confidentiality system for identifying and concealing confidential details in received data; (3) a data storage system for storing the received data; and (4) a data update system for examining stored data to identify and expose non-confidential details.

Therefore, the present invention provides a data management system and method.

BRIEF DESCRIPTION OF THE DRAWINGS

These and other features of this invention will be more readily understood from the following detailed description of the various aspects of the invention taken in conjunction with the accompanying drawings in which.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

In general, the present invention provides a data management system and method. As indicated above, data sharing can be extremely helpful in many fields of industry. However, certain types of data are sensitive and include details that an organization may wish to keep confidential. To date, this has prevented the free sharing of data among organizations. One type of sensitive data is known as "operational risk" data, which typically relates to the risk of loss resulting from failure within the organization itself (e.g., losses resulting from computer hacking). In this case, an organization may wish/need to report its loss from an operational risk, but also wish to conceal its identity. Still other types of data are required to be kept confidential by law, for reason of market advantage, or good security public image protection.

One scenario involving sensitive data arises where organizations leverage information descriptive of a particular market (the market being defined as the set of conditions under which participants exchange products). The knowledge of market information is useful to all, as it enables individuals to optimize their transactions. However, the information is often comprised of contributions that need to remain confidential, as no one wishes to reveal the particular conditions under which they transact. Examples of this data type include: (1) quotes in illiquid financial markets; (2) credit pricing information; and (3) insurance claims data.

Another scenario involving sensitive data is where each actor, together with specific industry organizations, leverages information descriptive of how other companies operate (including the business assumptions they make) to optimize or facilitate their own operations or trading conditions, or in the case of industry organizations, to develop rules or services beneficial to the industry. Examples of this data type include: (1) losses incurred as a result of operating or operational risks, as was discussed above; and (2) analysis results of information publicly available or accessible such as statistical data used in insurance industries, sectorial analysis used in banking and finance industries, company and industry ratings, etc.

The present invention provides a way for organizations to report these and other types of sensitive data so that confidential details remain confidential, yet all parties in a group of members can perform analyses on the confidential data as long as analyses results are presented to requesters in such a way that no confidentiality of data is breached. The present invention also limits access to the data so that only "approved" or "authorized" entities can gain access (as will be described in further detail below). It should be appreciated that although the present invention is preferably used to manage operation risk data, any type of sensitive data could be managed.

Figure 1:
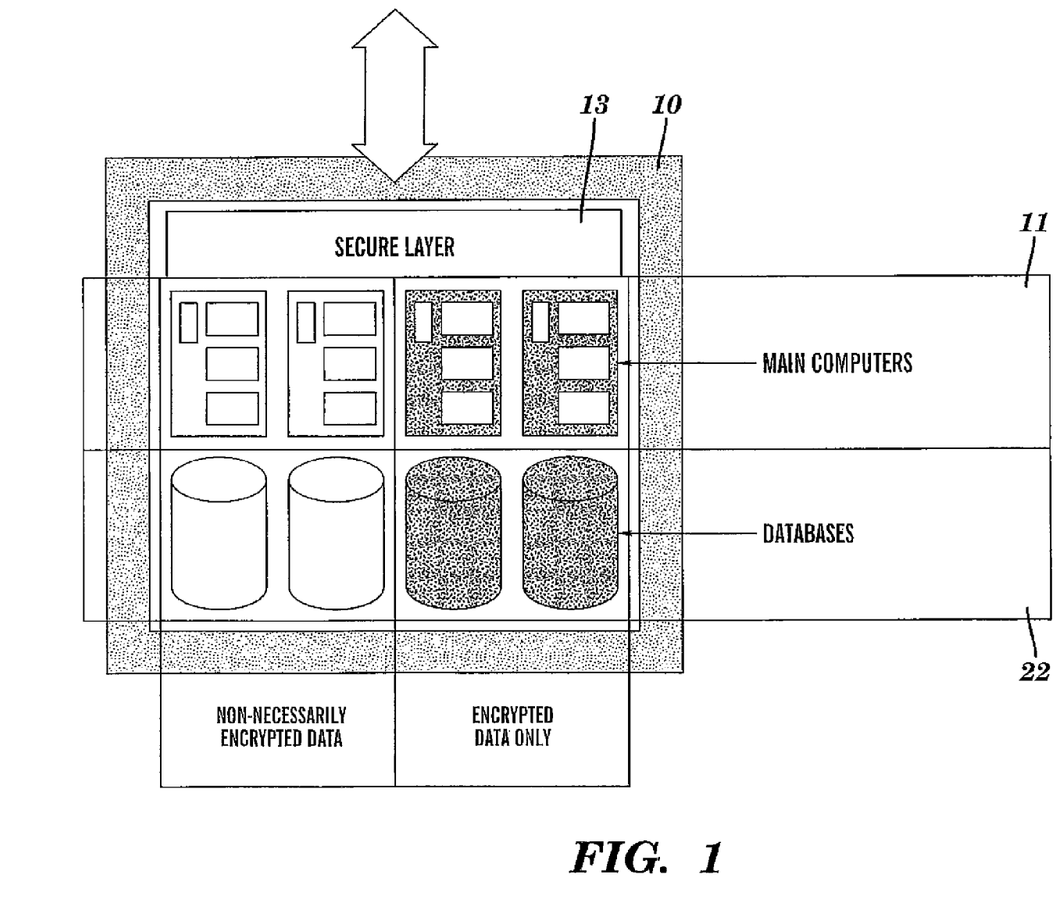
FIG. 1 depicts a data management system according to the present invention.

Referring now to FIG. 1, a data management system 10 in accordance with the present invention is shown. As depicted, data management system 10 includes secure layer 13, computer systems 11, and databases 22. In a typical embodiment, certain computer systems 11 are responsible for managing certain databases 22. Specifically, some computer systems 11 may control databases 22 that include only encrypted data, while other computer systems 11 may control databases 22 that have either encrypted or decrypted data. In general, computer systems 11 are field programmable, physically and logically secure computational devices such as the IBM 4758 PCI Cryptographic Coprocessor. Specifically, such systems 11 should be tamper resistant, tamper evident, tamper sensitive, tamper reactive and programmable. Secure layer 13 is a tamper resistant, tamper reactive, tamper sensitive, and tamper evident cryptography generator programmable hardware (with a processor or a coprocessor). This ensures that access to data management system 10 is limited to only authorized entities. It should be appreciated that the depiction shown in FIG. 1 is illustrative only, and that the quantity of computer systems 11 and/or databases 22 could vary.

Figure 2:
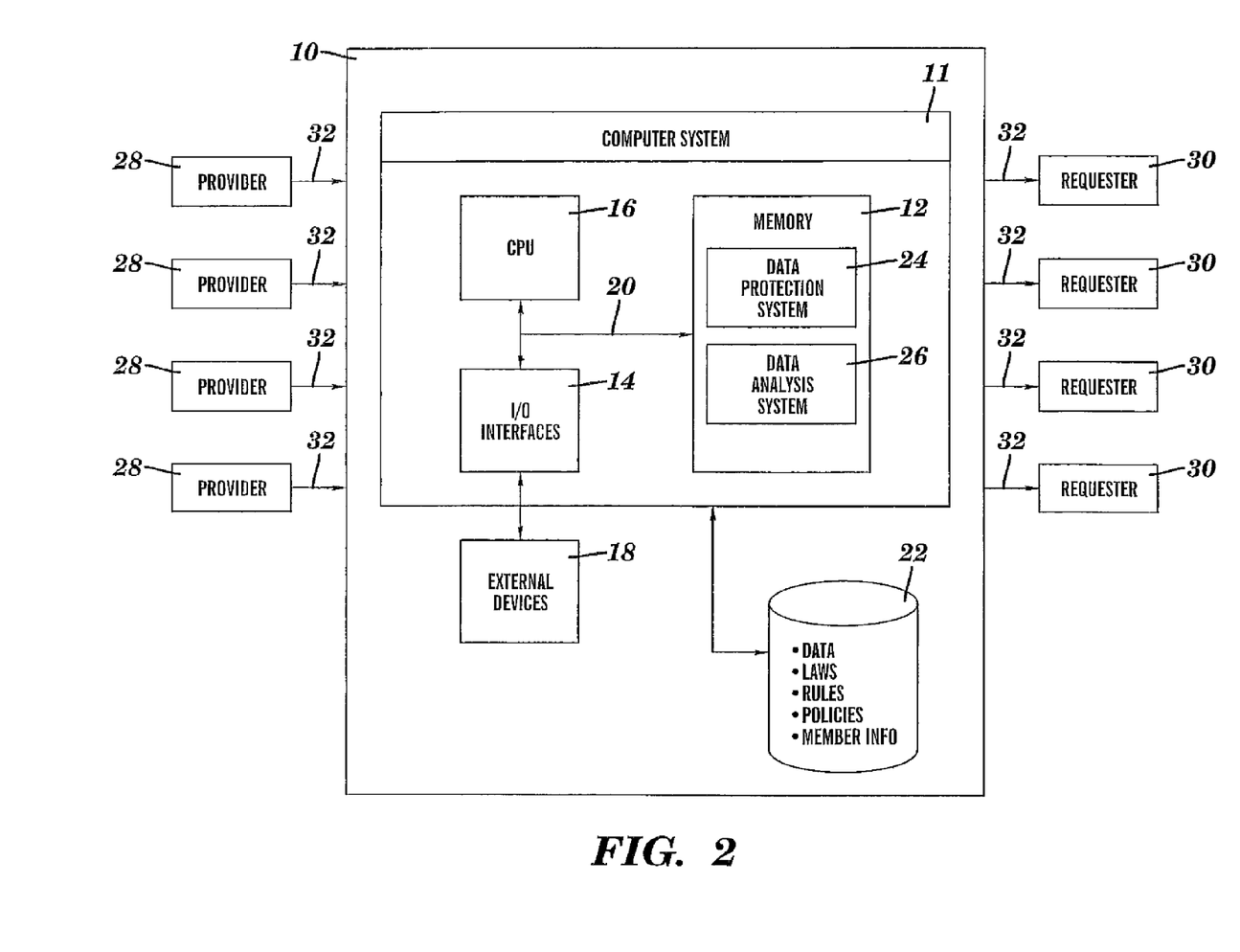
FIG. 2 depicts a computer system of the data management system having a data protection system and a data analysis system

Referring now to FIG. 2, a more detailed view of data management system 10 is shown. As depicted, data management system 10 includes computer system 11 (only one computer system 11 is shown for clarity purposes), which generally comprises memory 12, input/output (I/O) interfaces 14, a central processing unit (CPU) 16, external devices/resources 18, bus 20, and database 22. Memory 12 may comprise any known type of data storage and/or transmission media, including magnetic media, optical media, random access memory (RAM), read-only memory (ROM), a data cache, a data object, etc. Moreover, memory 12 may reside at a single physical location, comprising one or more types of data storage, or be distributed across a plurality of physical systems in various forms. CPU 16 may likewise comprise a single processing unit, or be distributed across one or more processing units in one or more locations, e.g., on a client and server.

I/O interfaces 14 may comprise any system for exchanging information to/from an external source. External devices 18 may comprise any known type of external device, including a CRT, LED screen, hand-held device, keyboard, mouse, voice recognition system, speech output system, printer, facsimile, pager, personal digital assistant, cellular phone, web phone, etc. Bus 20 provides a communication link between each of the components in the computer system 11 and likewise may comprise any known type of transmission link, including electrical, optical, wireless, etc. In addition, although not shown, additional components, such as cache memory, communication systems, system software, etc., may be incorporated into computer system 11.

Database 22 could provide storage for information necessary to carry out the present invention. Such information could include, among other things, a table that identifies: (1) data and statistics; (2) relevant confidentiality laws; (3) policies governing confidentiality and data authentication; (4) rules governing access to the data management system 10; and (5) member information. As shown in FIG. 1, database 22 may include one or more storage devices, such as a magnetic disk drive or an optical disk drive. In another embodiment database 22 includes data distributed across, for example, a local area network (LAN), wide area network (WAN) or a storage area network (SAN) (not shown). Database 22 may also be configured in such a way that one of ordinary skill in the art may interpret it to include one or more storage devices.

Figure 3:
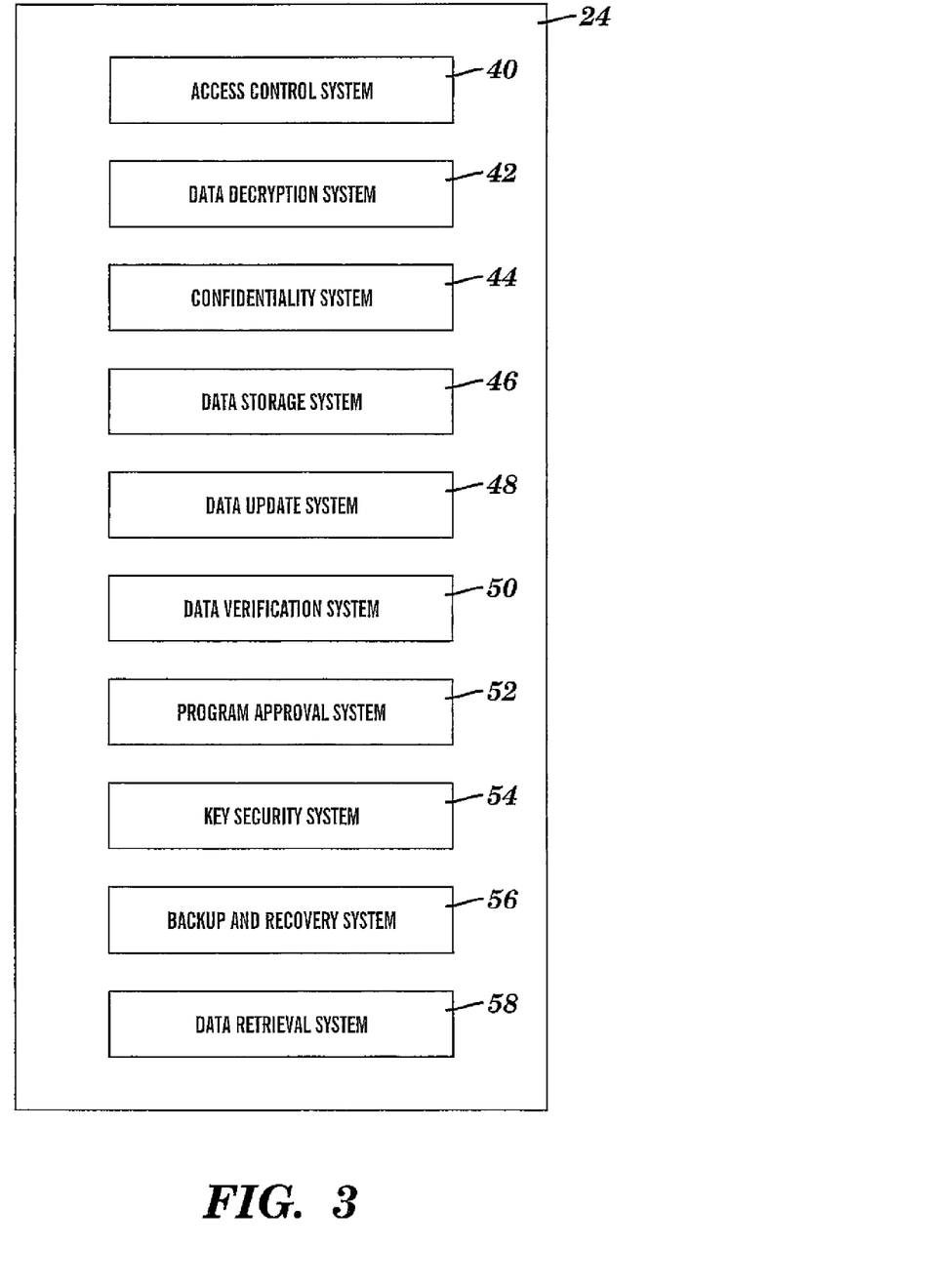
FIG. 3 depicts the data protection system of FIG. 2.

Stored in memory 12 are a data protection system 24 and a data analysis system 26. Data protection system 24 includes various systems for protecting data submitted by providers 28 and requested by requesters 30. Referring to FIG. 3, a more detailed view of data protection system 24 is shown. A depicted, data protection system 24 includes: (1) access control system 40; (2) data decryption system 42; (3) confidentiality system 44; (4) data storage system 46 (5) data update system 48; (6) data verification system 50; (7) program approval system 52; (8) key security system 54; (9) backup and recovery system 56; and (10) data retrieval system 58.

Data will be submitted to data management system 10 by authorized (members) providers 28, and subsequently decrypted by data decryption system 42. Whether provider 28 is authorized to submit data can be verified by access control system 40 based upon rules or protocols stored in database. Specifically, upon attempting to submit data, access control system 40 will first verify that provider 28 has the right to do so (i.e., is an authorized provider member). If not, the data will be rejected by data management system 10. In general, data is submitted to data management system 10 by approved providers according to randomly generated time intervals. Specifically, a random number generated/created by a provider 28 will cause a message to be composed at random (or with desired content) and sent to data management system 10 in an encrypted format. The message will request from the data management system 10 that it ask all providers 28 to submit a message of at least length L. Data decryption system 42 will decrypt the message, determine a new length L' at least equal to length L, and send a message to all providers 28 requesting data updates (new events and/or complements of previous data). All providers 28 will then send encrypted messages of length L' to data management system 10, which data decryption system 42 will decrypt. Some of the messages may contain actual data, while others may be empty to help deter eavesdropping.

As will be described in further detail below, all communication between providers 28 and data management system 10 is secure (as well as communication between requesters 30 and data management system 10). To this extend, private lines or couriers carrying data can be used, as well as public systems such as the Internet. In either event, protocols to protects against traffic analysis should be provided. In addition, communication is preferably encrypted to protect against eavesdropping and other attacks. Further, providers 28 can delay submitting data until the next time they provide a message at random so that deviations from statistical distributions cannot be detected. The process can also be modified so that while sending messages of length L', any provider 28 can embed a request for another round of data submission with a different length. A further modification allows providers 28 to request extra length L", wherein L" is be determined at random.

Preferably the data submitted (i.e., in length L') by each provider 28 should have a particular format (e.g., XML). One example of a data message is shown below:

S: Provider name A
N: Event identification number (known also by provider "A" for further information flows as needed)
T: Date of the event
T: Location (or list of locations) of the event
N: Nature of the event (as specified for instance by a number, or a collection of numbers as described below)
N: Is the event primary or is it a consequence of another event or chain of events?
N: Equipment involved (as specified for instance by a collection of numbers as described below)
T: Brands and designation of all pieces of equipment involved
N: Time elapsed between event and discovery
T: Chain of events arising from this event
T: Mitigation description (as specified for instance by a number, or a collection of numbers as described below)
N: Estimated cost associated to the event
T: Estimated cost associated to the chain of events the event belongs to In this example, "S" means the data is secret, "T" means the data is temporarily secret and/or possibly secret as described below, and "N" means the data is not secret. All data, secret or otherwise can be accessed by the data analysis system 26 to perform analyses and prepare reports. The nature of events can be specified according to numbers such that sets of events may get listed by assigned numbers. As time passes, a better understanding can lead to finer segmentation so that a cascade or list of numbers can then designate events. Also, the events can be grouped, and the groups grouped can be grouped and so on, so that events are designated by themselves, their groups, etc. This provides several levels of resolution for different statistical analyses.

The equipment associated with any event can be designated by using hierarchical groupings of numbers, or equivalently, by using a tree. Event mitigation can also be advantageously designated by sequences of numbers, which designate them progressively more and more precisely.

When data is received, data decryption system 42 will decrypt the data and confidentiality system 44 will identify and conceal any confidential details. This is generally accomplished by parsing the data and securing/encrypting any data marked "S" or "T." One example of a secret detail could be if a hack is reported on a bank in a small city in the Philippines. If the city has only one bank, the name of the city could be kept confidential so that the identity of the bank will not be known. Irrespective of this concealment, the details could still be used in statistical modeling as long as the confidentiality thereof is not compromised. For example, if statistics are gathered relating to hacks on banks in the Philippines, the data (e.g., financial loss) for the bank whose city was concealed will be considered without compromising the confidentiality of the concealed detail(s). The concealed details may be used in some cases, for example, if statistics are requested about events in small cities, and there are events associated with several small cities, the name of the city will be used to determine that the associated data has to be considered, but the name of the city will not be revealed. While such data remains at least temporarily secret, it may be replaced in some reports by less precise data that does not divulge the bank's identity or other information meant to remain secret. For example, a regional location of banks (e.g., the entire Philippines) could be used until enough local banks are formed so that divulging the city name does not divulge a particular bank's identity.

In addition to being designated by provider 28 with an "S" or "T" (or similar indicator), confidential details could be identified according to internal policies and/or laws. For example, local laws or internal policies may require that certain details are kept confidential. In such an instance, confidentiality system 44 will conceal these details. The protection of confidentiality under the present invention is intended to be such that no entity lacking authorization (including e.g., a system administrator or owner) can have access to the confidential data. This protection extends to scenarios involving destruction of the apparatus, using any known methods for confidentiality and code breaking, etc. Under the present invention, either the secret will be absolute for real time technology attacks (as the data will be re-encrypted and destroyed as technology advances), or keys to access some of the data as described in some warrants will be provided to government or regulatory bodies agents (where several agents may need to act together to ensure better security, according to well known practices in all forms of security).

Once any confidential details are concealed, data storage system 46 will store the data in database 22. Thereafter, data update system 48 will periodically update the stored data. Updating data includes both augmentation of data with new data as well as de-stripping of data. In the case of the latter, some details that were concealed as being confidential may no longer be confidential. In such instances, data update system will identify and expose the non-confidential details. This type of data is referred to above as secret or temporarily secret. One example of this could be where the number of banks in the city in Philippines passes a certain threshold (e.g., as dictated by system policies), the name of the city might no longer be confidential. The data could also be updated by data update system 48 for accuracy and also completed as a better understanding of the events reveals relevant facts that where not previously provided. For example, the cost and/or cause of an event may take time to be definitively determined. All such updates, whether about new facts or not, will be easily associated with the right event by using the event identification number.

Data verification system 50 verifies the accuracy of data from providers 28. Specifically, false data is difficult to extract accurate statistics from and serves no useful purpose. Accordingly, the present invention provides a mechanism that seriously deters intentionally inaccurate data. One such mechanism is to perform spot or random checks of the data and/or provider 28. For example, data verification system 50 could associate a random integer number N(A,k) to any provider "A", with N(A,k) at most equal to some upper bound UB for the $k^{th}$ lapse of time of duration T, thus:

$$N(A,k) \leq UB \text{ between times } (k-1)T \text{ and } kT.$$

For instance, T may be a year or a quarter. Then, at time kT, N(A,k) events reported by provider "A" are chosen at random, and agents, possibly from some regulatory body, are given the data reported by provider "A" about these events, and can perform any necessary inquiries. Part of the protection against false data can be achieved by automatic sensing and reporting of the events in data verification system 50. In this case, the sensors and communication means should be tamper resistant, tamper evident, tamper sensitive, and tamper reactive. In some industries, the participants of a data pool may prefer to expect that all other participants will act with good faith honesty rather than have the exposure to even limited control, as described above.

Program approval system 52 authorizes the use of a data analysis system 26 for analyzing data collected by data management system 10. Specifically, as shown in FIG. 1, computer system 11 could be provided with a software program (i.e., data analysis system) that can manipulate the provided data. However, before a particular system 26 can be implemented, permission could be required. In a typical embodiment shown in FIG. 4, a group of experts 100 could create a new data analysis system 26. This data analysis system 26 is circulated among the member entities 100A-F and each signs a well-defined hash of the data analysis system 26. The data analysis system 26 with all member signatures is then sent to the data management system 10, where all signatures are checked before the data analysis system 26 is accepted. Requests for actions of the existing program will similarly carry all needed signatures. In some case, copies of such requests will be kept by all members who can request the corresponding analysis at will, and unknowingly from the others. In other cases, all or some members must sign the inquiry just before it is made, or once for any inquiry with no control of the actual time of use. Validity of the signatures and their authority level will be checked with a tool such as Tivoli Policy Director.

Figure 4:
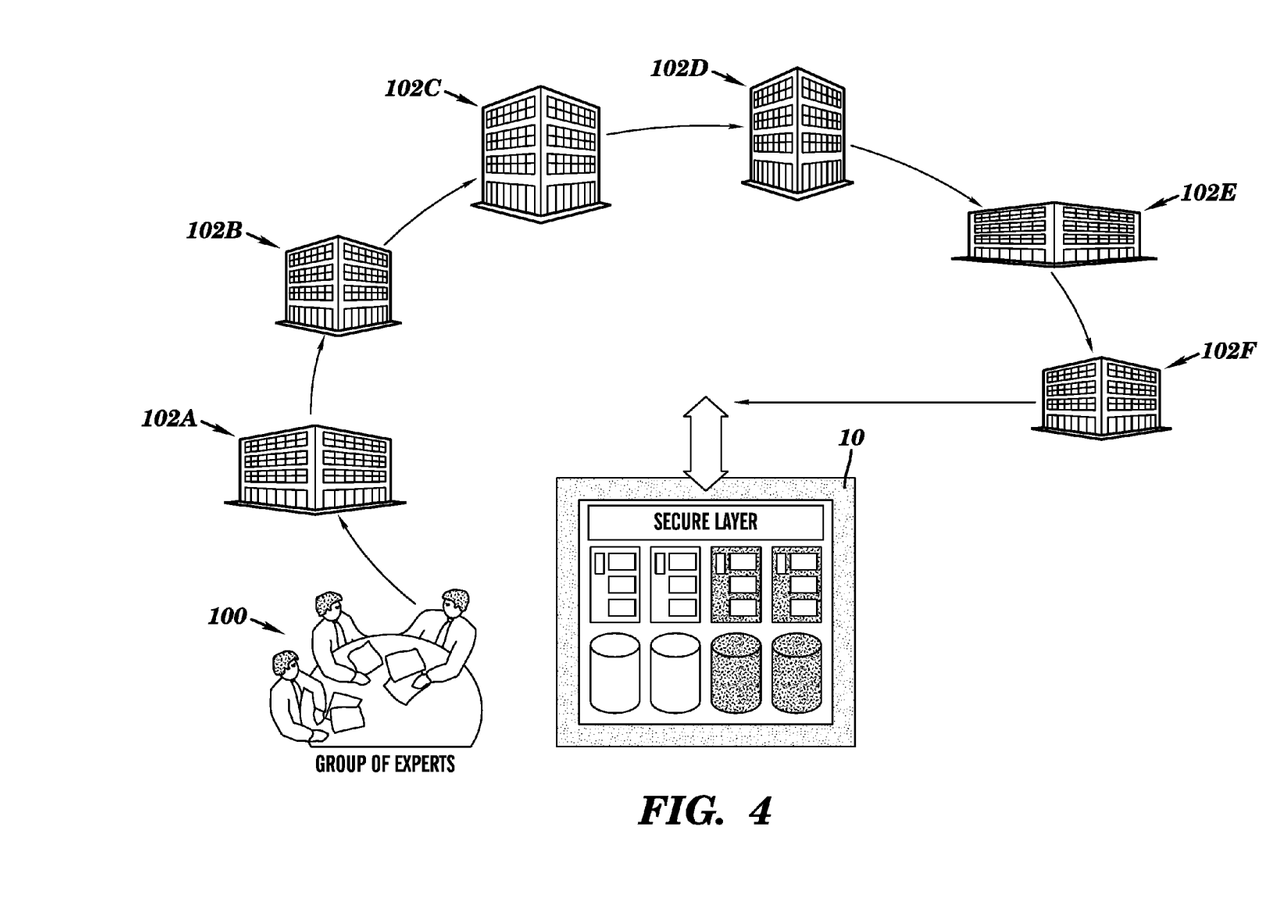
FIG. 4 depicts an approval process for a data analysis system.

On some occasions, a proposed data analysis system might provide low value results because the way in which it performs analyses, and/or presents analyses results, compromises the confidentiality of the data. On such occasions, combinations of policy changes and modification(s) of the data analysis system will be tested on "fake" data until a threshold is reached where desired confidentiality is preserved, yet the data analysis system provide useful information.

As indicated above, access to data management system 10 is controlled by access control system 40 (FIG. 3). Specifically, access control system 40 ensures that only authorized entities can interact with system 10. In a typical embodiment, different classes of entities could be provided, as governed by internal rules. For example, non-member entities (i.e., the system owner or administrator) may only have permission to administer data management system 10 but not to access analyses reports or data. Moreover, some member entities (e.g., provider members or requester members) may have access only to provide data or request data analyses. Alternatively, some entities might have "full member rights" access to data management system 10 whereby such members can interact with all aspects of system 10. Typically, only full rights members can determine whether a particular data analysis system 26 can be implemented on data management system 10. In one embodiment of the present invention, no entity (member or non-member) can access the data itself. In another embodiment, only entities with special permission can access the data. In yet another embodiment, only government or regulatory agents can access the data with special keys (as will be further described below). In such an instance, several agents could be required to act in concert for access to be granted. Alternatively, the agents could be required to be acting pursuant to a warrant for access to be granted.

Data protection system 24 is also provided with key security system 54, which protects encryption/decryption keys used for data received from providers 28 as well as those for concealing confidential details of received data. In a typical embodiment, key security system 54 will destroy any keys upon a breach of system 10. Such a function is provided by reactive systems such as the IBM 4758, and can be augmented by extra equipment for surveillance and means of destruction of the machine.

Backup and recovery system 56 allow data to remain intact in the event of system 10 failure. In addition, backup and recovery system 56 provides redundancy so that soon after a local attack or failure, the original level of security is restored (as will be further described below). All secure hardware that maintains the keys and guards against any undesired access to data should preferably come in multiple copies, disseminated in various locations sufficiently remote from each other and protected against global destruction. One way to provide such redundancy is to have series of machines such as the IBM 4758 recognize each other as uncorrupted machines using their machine generated master keys, and then collectively determine common actual master keys for the rest of the operations. This can be accomplished by randomly electing a master machine, or by using a system such as a Diffie-Hellman session. This system of utilizing secure machines could also provide an access key for agents of the government or regulatory bodies (as described above). Typically, multiple keys that need to be activated simultaneously would be needed for such access. Many scenarios can be used to generate such special access keys. For instance, the keys could be given once to appropriate agencies, or an agency could request that some minimal number of participants be granted access to the system 10 or data (e.g., if a warrant is issued). Collectively, these and other key methods can be used to control access data management system 10 and data stored therein. In any event, the use of secure way machines that are tamper resistant, tamper evident, tamper sensitive, tamper reactive (in erasing their key when an attack is detected), and programmable ensures the confidentiality of data.

Data retrieval system 58 provides a mechanism for requesters 30 to gain access stored and/or analyzed data. Specifically, data retrieval system 58 provides a way for requestors 30 to access data analysis system 26, or the results thereof, to obtain information (e.g., data, statistics, etc.). As indicated above, however, access data analysis system 26 is limited by access control system 40 to authorized requesters. On example of an approved requester 30 could be an organization that has been the victim of an event that resulted in lost profits. In such an event, requester 30 could access data to identify possible solutions for the loss. Such solutions could include, for example, organization, technological, and/or financial solutions. For example, requester 30 could obtain a list of qualified repairmen.

It should be understood that all systems 40-58 of data protection system 24 could be implemented as hardware, software, manpower, or any combination thereof.

Referring back to FIG. 1, communication with data management system 10 occurs via communication links 32. Communications links 32 can include a direct terminal connected to the data management system 10, or a remote workstation in a client-server environment. In the case of the latter, the client and server may be connected via the Internet, wide area networks (WAN), local area networks (LAN) or other private networks. The server and client may utilize conventional token ring connectivity, Ethernet, or other conventional communications standards. Where the client is connected to the system server via the Internet, connectivity could be provided by conventional TCP/IP sockets-based protocol. In this instance, the client would utilize an Internet service provider outside the system to establish connectivity to the system server within the system.

It is understood that the present invention can be realized in hardware, software, or a combination of hardware and software. Moreover, computer systems 11 according to the present invention can be realized in a centralized fashion in a single computerized workstation, or in a distributed fashion where different elements are spread across several interconnected systems as shown in FIG. 2 (e.g., a network). Any kind of computer/server system(s)—or other apparatus adapted for carrying out the methods described herein—is suited. A typical combination of hardware and software could be a general purpose computer system with a computer program that, when loaded and executed, controls computer system 11 such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

Hereinabove, two scenarios involving sensitive data were discussed. A third scenario involves situations where law, regulation, or practice directly or indirectly prevents disclosure of a link between pieces of information and the identity of providers. Examples of this include: (1) where entities are required to maintain "Chinese Walls" between various activities; and (2) where countries prohibit that company or customer-related information is exported outside their territory.

With respect to the first example, the policy/requirement for a "Chinese Wall" may be reformulated (based upon the benefits of present invention) so as to allow data to be exploited under the present invention and to allow commercial propositions corresponding to the appropriate lines of business to be sent through those business units (without informing the agents how the decision was made to formulate the propositions). Specifically, an automatic Customer Relationship Management (CRM) tool could run inside of the entity's "Chinese Wall" and verify, before making any conclusion, whether the entity has allowed for these systems. For verification, cases from which all personal information has been removed will be provided by the system to agents responsible for the system's efficient running.

In addition, counters could be used to limit the number of commercial conclusions and proposals the CRM tool would draw for any entity. An incentive for the entity to have some analysis made would be that multiple registrations of a given individual through multiple lines of business would be matched as belonging to the same person. As consequences emanate from several lines of business, this person would be addressed only once, and in the case of similar but different campaigns, a choice of one may be enforced to ensure the individual is not submerged.

With regard to the second example, the fact that confidential data is never disclosed under the present invention, may allow a regulator to correspondingly modify the rules. For instance, banks in country "X" may benefit from data about operational risk in Business to Business (B2B) exchanges from other countries, which they would not access without participating in the pools of data. The present invention may provide incentive for modifying the rules with the consent of the B2B markets participants who would thus, obtain better services while being guaranteed that data they wish to keep confidential remains as such.

Thus, the present invention allows data analysis on possibly scarce but nonetheless confidential data. This analysis permits operational risk mitigation by developing and making available data about protection, diagnosis methods, correction tools, methods, and experts. This is so that a member victim of an event will be able to access solutions that could include organizational, technological, financial (new types of insurance policies for instance), etc. For example, a list of expert repairmen/repair organizations with proper credentials could be accessed. In this example, the present invention could incorporate ratings of repair organizations while not compromising confidential details of previous engagements.

In addition, the present invention also permits the building of backups of infrastructures at the level for instance of cities, states, countries or beyond, to ensure the overall resiliency of an industry to large scale natural, accidental, or criminal events. Accordingly, the present invention can be an essential tool to build elements enabling total resiliency of an industry where data and methods need some level of confidentiality. The fact that the present invention allows data to be shared without breaching confidentiality should also allow governing bodies, or commonly allocated funds, to fund redundancy components of the global infrastructure of markets.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A data management system, comprising:
an access control system for limiting access to the data management system to authorized entities;
a data confidentiality system for identifying details in received data, the received data being operational risk data that is received at randomly generated time intervals in a secured manner from an authorized provider, as one of secret, temporarily secret, possibly secret, and not secret, wherein secret, temporarily secret and possibly secret comprise confidential details and concealing confidential details in received data from a requester while allowing a composite analysis to be performed by the requester that is based on the confidential details;
a data storage system for storing the received data; and
a data update system for periodically automatically examining stored data to identify and expose any confidential details that have become non-confidential details.

2. The system of claim 1, further comprising:
a data decryption system for decrypting received data;
a data verification system for verifying an accuracy of received data;
a program approval system for approving systems for analyzing the stored data; and
a key security system for protecting encryption keys.

3. The system of claim 1, wherein stored data is analyzed with a data analysis system.

4. The system of claim 3, wherein the data analysis system is permitted to analyze the stored data based upon approval by full rights members of the data management system.

5. The system of claim 1, wherein data management system is a tamper resistant, tamper evident, tamper sensitive, tamper reactive, and programmable system.

6. The system of claim 1, wherein the received data and the stored data are operational risk data.

7. The system of claim 1, wherein the system mitigates operational risk.

8. The system of claim 1, wherein data is received based upon a randomly generated time interval.

9. The system of claim 1, wherein the confidential details cannot be accessed by any entity.

10. The system of claim 1, wherein the confidential details can only be accessed by a plurality of entities acting in concert.

11. The system of claim 1, further comprising a customer relationship management tool for verifying a policy of an entity.

12. A data management system, comprising:
an access control system for limiting access to the data management system to authorized entities;
a data decryption system for receiving at randomly generated time intervals and decrypting received operational risk data received in a secured manner from an authorized provider;
a data confidentiality system for identifying details in the received data as one of secret, temporarily secret, possibly secret and not secret, wherein secret, temporarily secret and possibly secret comprise confidential details and concealing confidential details in the received data from a requester while allowing a composite analysis to be performed by the requester that is based on the confidential details;
a data storage system for storing received data after the confidential details have been concealed;
a data update system for periodically examining stored data to identify and expose any confidential details that have become non-confidential details;
a program approval system for approving systems for analyzing the stored data; and
a key security system for protecting encryption keys.

13. The system of claim 12, wherein stored data is analyzed with a data analysis system.

14. The system of claim 13, wherein the data analysis system is permitted to analyze the stored data by the program approval system based upon approval by full rights members of the data management system.

15. The system of claim 12, wherein a provider submits the operational risk data to the data management system, and wherein a requester accesses the stored data.

16. A program product stored on a computer readable storage medium, for managing data, which when executed, comprises:
an access control system for limiting access to the data management system to authorized entities;
a data confidentiality system for identifying details in received data, the received data being operational risk data that is received at randomly generated time intervals in a secured manner from an authorized provider, as one of secret, temporarily secret, possibly secret and not secret, wherein secret, temporarily secret, and possibly secret comprise confidential details and concealing confidential details in the received data from a requester while allowing a composite analysis to be performed by the requester that is based on the confidential details;
a data storage system for storing the received data; and
a data update system for periodically examining stored data to identify and expose any confidential details that have become non-confidential details.

17. The program product of claim 16, further comprising:
a data decryption system for decrypting received data;
a data verification system for verifying an accuracy of received data;
a program approval system for approving systems for analyzing the stored data; and
a key security system for protecting encryption keys.

18. The program product of claim 16, further comprising a data analysis system for analyzing the stored data.

19. The program product of claim 16, wherein the data analysis system is approved by full rights member.

20. The program product of claim 16, wherein the received data is operational risk data.

* * * * *